US010017267B2

(12) United States Patent
Pautis et al.

(10) Patent No.: US 10,017,267 B2
(45) Date of Patent: Jul. 10, 2018

(54) ENGINE ASSEMBLY FOR AN AIRCRAFT COMPRISING A PRIMARY STRUCTURE OF A MOUNTING PYLON EQUIPPED WITH A BOX EXTENSION COMPRISING TWO PARTS IN THE OVERALL SHAPE OF AN ARCH

(71) Applicant: Airbus Operations (SAS), Toulouse (FR)

(72) Inventors: Olivier Pautis, Merville (FR); Jean Michel Rogero, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 156 days.

(21) Appl. No.: 15/231,898

(22) Filed: Aug. 9, 2016

(65) Prior Publication Data

US 2017/0043878 A1  Feb. 16, 2017

(30) Foreign Application Priority Data

Aug. 13, 2015 (FR) ...................................... 15 57719

(51) Int. Cl.
| | |
|---|---|
| *B64D 27/26* | (2006.01) |
| *B64D 27/12* | (2006.01) |
| *F01D 25/28* | (2006.01) |
| *F02C 7/20* | (2006.01) |

(52) U.S. Cl.
CPC ............. *B64D 27/26* (2013.01); *B64D 27/12* (2013.01); *F01D 25/28* (2013.01); *F02C 7/20* (2013.01); *B64D 2027/264* (2013.01); *F05D 2240/90* (2013.01); *Y02T 50/44* (2013.01); *Y02T 50/671* (2013.01)

(58) Field of Classification Search
CPC .. B64D 27/26; B64D 2027/264; B64C 27/12; B64C 27/26; F01D 25/28; F02C 7/20; F05D 2240/90
USPC ......................................................... 244/54
See application file for complete search history.

(56) References Cited

U.S. PATENT DOCUMENTS

| | | | | |
|---|---|---|---|---|
| 5,351,930 A | * | 10/1994 | Gwinn ................... | B64D 27/26 244/54 |
| 5,806,792 A | * | 9/1998 | Brossier ................. | B64D 27/18 244/54 |
| 5,860,275 A | | 1/1999 | Newton et al. | |
| 6,607,165 B1 | * | 8/2003 | Manteiga ............... | B64D 27/18 244/54 |

(Continued)

FOREIGN PATENT DOCUMENTS

| | | |
|---|---|---|
| EP | 0787895 | 8/1997 |
| EP | 2025898 | 2/2009 |

(Continued)

OTHER PUBLICATIONS

French Search Report, dated Jun. 24, 2016, priority document.

*Primary Examiner* — Justin M Benedik
(74) *Attorney, Agent, or Firm* — Greer, Burns & Crain Ltd.

(57) ABSTRACT

An engine assembly for an aircraft rigid structure comprising a mounting pylon comprising a central box and a box extension connected to a reducing gear case of the turboreactor. The box extension includes two parts bearing the front engine attachments, these pieces each comprising a structure forming a reinforcing rib of the central box, as well as two parts of horseshoe shape surrounding the reducing gear case.

12 Claims, 4 Drawing Sheets

(56) References Cited

U.S. PATENT DOCUMENTS

| | | | | |
|---|---|---|---|---|
| 7,963,479 | B2* | 6/2011 | Cazals | B64D 27/26 244/54 |
| 9,676,489 | B2* | 6/2017 | Serra | B64D 27/26 |
| 2007/0228213 | A1* | 10/2007 | Diochon | B64D 27/26 244/54 |
| 2008/0217467 | A1* | 9/2008 | Lafont | B64D 27/18 244/54 |
| 2008/0223983 | A1* | 9/2008 | Lafont | B64D 27/26 244/54 |
| 2008/0315033 | A1* | 12/2008 | Diochon | B64D 27/18 244/54 |
| 2009/0056343 | A1 | 3/2009 | Suciu et al. | |
| 2009/0212155 | A1* | 8/2009 | Huggins | B64D 27/26 244/54 |
| 2010/0193627 | A1* | 8/2010 | Lafont | B64D 27/18 244/54 |
| 2014/0021292 | A1 | 1/2014 | West | |
| 2015/0013142 | A1* | 1/2015 | West | B64D 27/18 29/525.08 |
| 2015/0166192 | A1* | 6/2015 | Ewens | B64D 27/26 244/54 |

FOREIGN PATENT DOCUMENTS

| | | |
|---|---|---|
| FR | 3014841 | 6/2015 |
| WO | 2015047539 | 4/2015 |

* cited by examiner

ENGINE ASSEMBLY FOR AN AIRCRAFT COMPRISING A PRIMARY STRUCTURE OF A MOUNTING PYLON EQUIPPED WITH A BOX EXTENSION COMPRISING TWO PARTS IN THE OVERALL SHAPE OF AN ARCH

CROSS-REFERENCES TO RELATED APPLICATIONS

This application claims the benefit of the French patent application No. 1557719 filed on Aug. 13, 2015, the entire disclosures of which are incorporated herein by way of reference.

BACKGROUND OF THE INVENTION

The present invention relates to an engine assembly for an aircraft comprising a turbofan turbine engine of which the fan is driven by reduction gearing, a turbine engine mounting pylon and attachment means for attaching the turbine engine to the primary structure of the mounting pylon.

The invention also relates to an aircraft equipped with at least one such engine assembly. It preferably applies to commercial airplanes.

On existing aircraft, the engines such as the turbine engines are suspended beneath the wing structure by complex attachment devices also referred to as EMS (which stands for Engine Mounting Structure), or even referred to as "mounting pylons." The mounting structures usually employed have a rigid structure referred to as a primary structure. This primary structure generally comprises a box, which means to say, a structure formed by the assembly of lower and upper longitudinal members connected to one another by a plurality of transverse stiffening ribs situated on the inside of the box. The longitudinal members are arranged on the upper and lower faces, while lateral panels close the lateral faces of the box.

In the known way, the primary structure of these pylons is designed to allow the static and dynamic loads generated by the engines, such as the weight and the thrust, or even the various dynamic loadings to be transmitted to the wing structure.

In the solutions known from the prior art, the transmission of load between the engine and the primary structure is performed traditionally by attachment means consisting of one or more front engine mounts, a rear engine mount, and a thrust load reacting device formed by two lateral link rods articulated to a balance beam. One embodiment of such an engine assembly is known, for example, from document FR 3 014 841.

In the case of a turbofan turbine engine in which the fan is driven by reduction gearing, there is a need to optimize the existing solutions with a view notably to reducing the bulk, the overall weight, and the aerodynamic disturbances generated by the presence of the pylon attachment means on the turbine engine.

SUMMARY OF THE INVENTION

It is therefore an object of the invention to propose an engine assembly for an aircraft that at least partially meets the requirement mentioned hereinabove.

To do this, one subject of the invention is an engine assembly for an aircraft comprising:

a turbofan turbine engine of which a fan is driven by reduction gear, the turbine engine comprising a reducing-gear case surrounding the reduction gear;

a turbine engine mounting pylon, comprising a primary structure equipped with a central box; and means for attaching the turbine engine to the primary structure of the mounting pylon.

According to the invention, the rigid structure of the mounting pylon also comprises a box extension connected to the front of the central box, the box extension comprising:

a first component produced as a single piece and arranged in a vertical and transverse plane of the engine assembly, the first component comprising a first part in the overall shape of an arch extending around the reducing-gear case, and a first connecting structure constituting a transverse stiffening rib of the central box, the first part in the overall shape of an arch having two first opposite ends; and a second component produced as a single piece and comprising a second part in the overall shape of an arch extending at least partly around the reducing-gear case, and a second connecting structure constituting an interior transverse stiffening rib of the central box, the second part in the overall shape of an arch having two second opposite ends respectively mounted on the two first opposite ends, the second part in the overall shape of an arch extending rearward and toward the central box from its second opposite ends.

In addition, the attachment means comprise two lateral front attachments and a central front attachment, each of the two lateral front attachments connecting the reducing-gear case to one of the two first ends of the first part in the overall shape of an arch and each reacting load in a longitudinal direction and in a vertical direction of the engine assembly, and the central front attachment connecting the reducing-gear case to a first central portion of the first part in the overall shape of an arch and reacting load in a transverse direction of the engine assembly.

The invention proposes a simple solution that meets the requirement identified hereinabove, notably thanks to the use of the first and second one-piece components which allow improved transmission of load because they extend as far as the central box of the mounting pylon. That in particular makes it possible to reduce the bulk and mass of the engine assembly comprising the pylon, which assembly no longer requires lateral thrust-load reacting link rods. This reduction in mass is advantageously accompanied by a reduction in specific fuel consumption.

Also, the lateral and central front attachments are able to react most of the load at the level of the reducing-gear case. This particular feature is not only beneficial insofar as it allows the load to be reacted as close as possible to a center of gravity of the turbine engine for purer transmission of this load, but also because it makes it possible to provide a rear engine mount of simplified design and therefore small bulk. Simplifying this rear engine mount, which is positioned in the bypass stream of the turbine engine, makes it possible to limit the aerodynamic disturbances on the bypass flow. All of the aerodynamic performance aspects of the engine assembly are therefore improved as a result.

Finally, connecting the lateral and central front attachments to the reducing-gear case rather than to the fan case means that a larger sized turbine engine can be incorporated while at the same time maintaining sufficient ground clearance. That also makes it possible to limit the deformation of the various bodies of the engine case, under the application of load.

The invention preferably envisions at least one of the following optional features, considered in isolation or in combination.

The second component of the box extension extends in a plane that is inclined with respect to the vertical and longitudinal directions of the engine assembly, preferably inclined by an angle comprised between 30 and 60° with respect to the longitudinal direction.

The two lateral front attachments are arranged symmetrically with respect to a vertical and longitudinal midplane of the engine assembly, the vertical and longitudinal midplane passing through the central front attachment.

The two lateral front attachments are arranged in angular positions one of them between 2 o'clock and 3 o'clock and the other between 9 o'clock and 10 o'clock.

The attachment means form a statically determinate load-reacting system and are made up of the two lateral front attachments, the central front attachment, and a rear attachment reacting load in the vertical direction, and preferably only in this vertical direction.

The box extension comprises at least one skin externally covering the first and second parts in the overall shape of an arch.

The second opposite ends are mounted on the two first opposite ends by two shear pins respectively, these preferably being oriented in the transverse direction.

The turbine engine comprises, in succession, from the front toward the rear, a fan case, an intermediate case, the reducing-gear case, a central case and a turbine case.

Another subject of the invention is an aircraft comprising at least one such engine assembly and a wing on which the engine assembly is mounted.

For preference, the engine assembly is suspended beneath the wing, even though another solution could be adopted, in which the turbine engine would be arranged above the wing of the aircraft.

Further advantages and features of the invention will become apparent from the nonlimiting detailed description below.

BRIEF DESCRIPTION OF THE DRAWINGS

This description will be given with reference to the attached drawings among which.

DETAILED DESCRIPTION OF THE PREFERRED EMBODIMENTS

Figure 1:
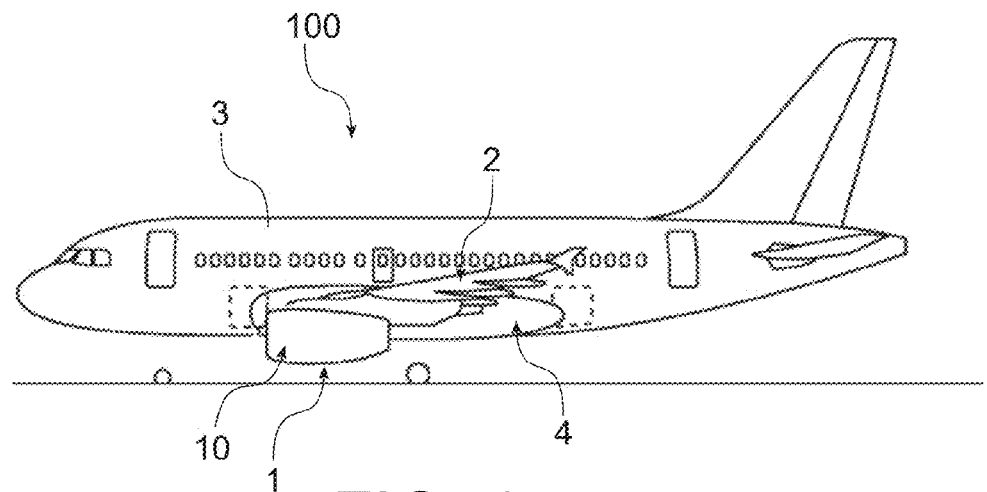
FIG. 1 depicts an aircraft equipped with an engine assembly according to the invention.

Reference is made to FIG. 1 which depicts an aircraft 100 comprising a fuselage 3 to which two wings 2 are fixed. Underneath each of these wings 2 is suspended one or more engine assemblies 1 according to the invention. Each engine assembly 1 comprises a bypass turbofan turbine engine 10 of the type comprising reduction gearing for driving the fan, a mounting pylon 4 for mounting the turbine engine 10, and means (not visible in FIG. 1) for attaching the turbine engine 10 to a rigid structure of the pylon 4.

Throughout the description which will follow, by convention, the X-direction corresponds to the longitudinal direction of the engine assembly 1, which is also likenable to the longitudinal direction of the turbine engine 10 and of the pylon 4. This X-direction is parallel to a longitudinal axis 5 of this turbine engine 10. Furthermore, the Y-direction corresponds to the direction oriented transversely with respect to the engine assembly 1, and also likenable to the transverse direction of the turbine engine 10 and of the pylon 4, whereas the Z-direction corresponds to the vertical or height direction. These three directions, X, Y and Z are mutually orthogonal and form a direct trihedron.

Furthermore, the terms "front" and "rear" are to be considered with respect to a direction of forward travel of the aircraft encountered as a result of the thrust applied by the turbine engines 10, this direction being schematically depicted by the arrow 19.

Figure 2:
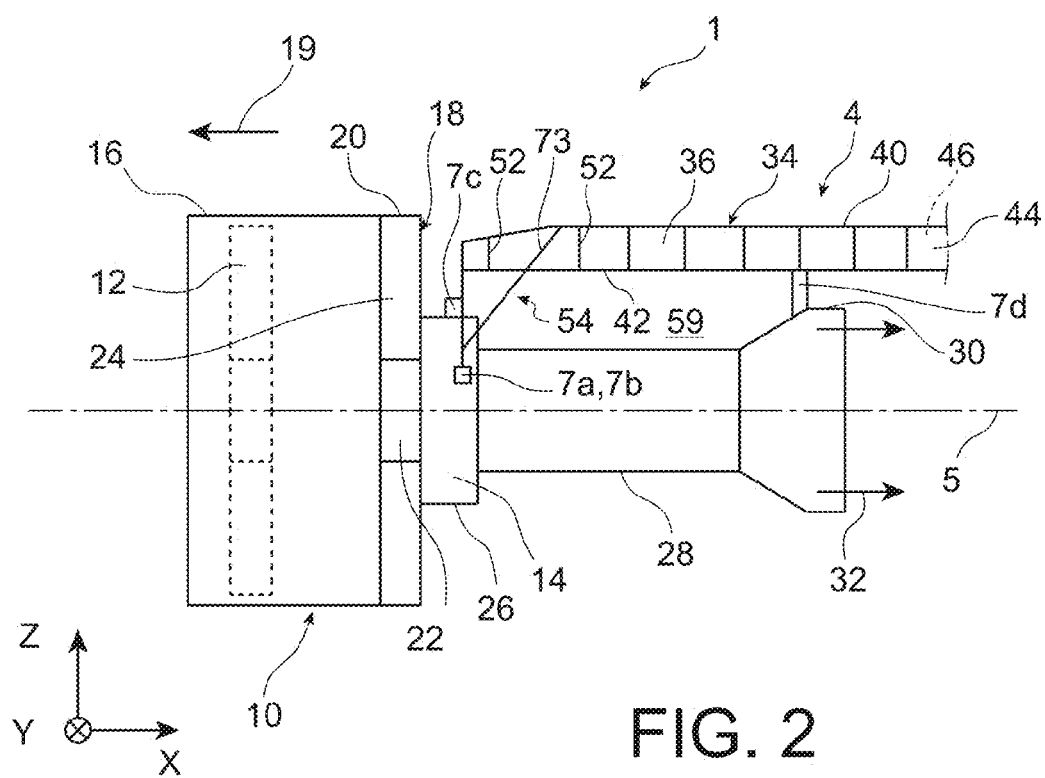
FIG. 2 is a schematic view in cross section of one preferred embodiment of the engine assembly according to the invention.

Reference is now made to FIG. 2 which schematically depicts an engine assembly 1 according to a preferred embodiment of the invention. This assembly therefore comprises the turbine engine 10, the specific feature of which is that it incorporates a fan 12 driven by reduction gearing 14. This type of turbine engine is known as a GTF turbine engine (which stands for Geared Turbofan Engine).

The turbine engine comprises, from the front toward the rear, a fan case 16, and an intermediate case 18, an outer shroud 20 of which axially extends the fan case 16. The intermediate case 18 also comprises a hub 22 and radial structural arms 24 connecting the hub 22 to the outer shroud 20. These arms 24 are arranged inside an annular row of outlet guide vanes, also abbreviated to OGV.

At the rear of the intermediate case 18, the turbine engine 10 comprises a reducing-gear case 26 enclosing the reduction gearing 14. This reducing-gear case 26 has a diameter very much smaller than that of the outer shroud 20. Still toward the rear, there is then a central case 28, also referred to as the "core case" which constitutes the narrowest part of the turbine engine and notably contains the combustion chamber (not depicted). The central case 28 is then extended toward the rear by a turbine case 30 of larger size, and from which the gases of the primary stream can escape, as depicted schematically by the arrow 32.

In the known way, in this type of turbine engine 10, combustion has the effect of driving the high-pressure and low-pressure spools and it is the low-pressure spool that transmits the mechanical energy to the reduction gearing 14, which itself then drives the fan 12.

The engine assembly 1 also comprises the mounting pylon 4, only the rigid structure 34 of which has been depicted in FIG. 2. The primary structure 34 is designed to allow the static and dynamic loads generated by the engines, such as the weight and the thrust, or even the various dynamic loads, notably those associated with failures such as: loss of blades (FBD), retraction of the front landing gear, dynamic landing, etc. to be transmitted to the wing structure. The other constituent elements of this pylon 4, which have not been depicted and which are of secondary structure type providing segregation and retention of systems while at the same time supporting the aerodynamic fairings, are conventional elements similar to those encountered in the prior art. For this reason, no detailed description thereof will be given.

The primary structure 34, or rigid structure, comprises by way of main element a central box 36 extending over the engine length of the primary structure 34 in the X-direction.

The central box 36 is of substantially conventional design, which means to say is delimited at the top by upper longitudinal members 40, at the bottom by lower longitudinal members 42, and laterally by an outer lateral panel 44 and an inner lateral panel 46. By way of indication, it is noted that the upper longitudinal members 40 are also referred to as the "pylon box upper panel" and that the lower longitudinal members 42 are also referred to as the "pylon box lower panel". Furthermore, the central box 36 is equipped with interior transverse stiffening ribs 52, preferably hollowed at their center and preferably arranged mostly in YZ planes. This central box 36 has a YZ cross section of square or rectangular overall shape, of a size that evolves along the X-direction. This cross section may remain substantially constant for the rear part situated at the level of the wing, but then narrows as it extends forward, as far as its front end situated in the vicinity of the reducing-gear case 26.

One of the particular features of the invention lies in the presence of a box extension 54 connected to the front of the central box 36 and extending the latter substantially downward toward the reducing-gear case 26. This box extension 54 will be detailed hereinafter with reference to FIGS. 3 to 5.

Furthermore, the engine assembly 1 comprises attachment means 7a-7d for attaching the turbine engine 10 to the rigid structure 34 of the pylon. These attachment means 7a-7d consist of two lateral front attachments 7a, 7b, of a central front attachment 7c, and of a rear attachment 7d. The front attachments 7a-7c connect the box extension 54 to the reducing-gear case 26, whereas the rear attachment 7d connects the lower longitudinal member 42 to the turbine case 30, being situated in a bypass stream 59 of the turbine engine.

Figure 3:
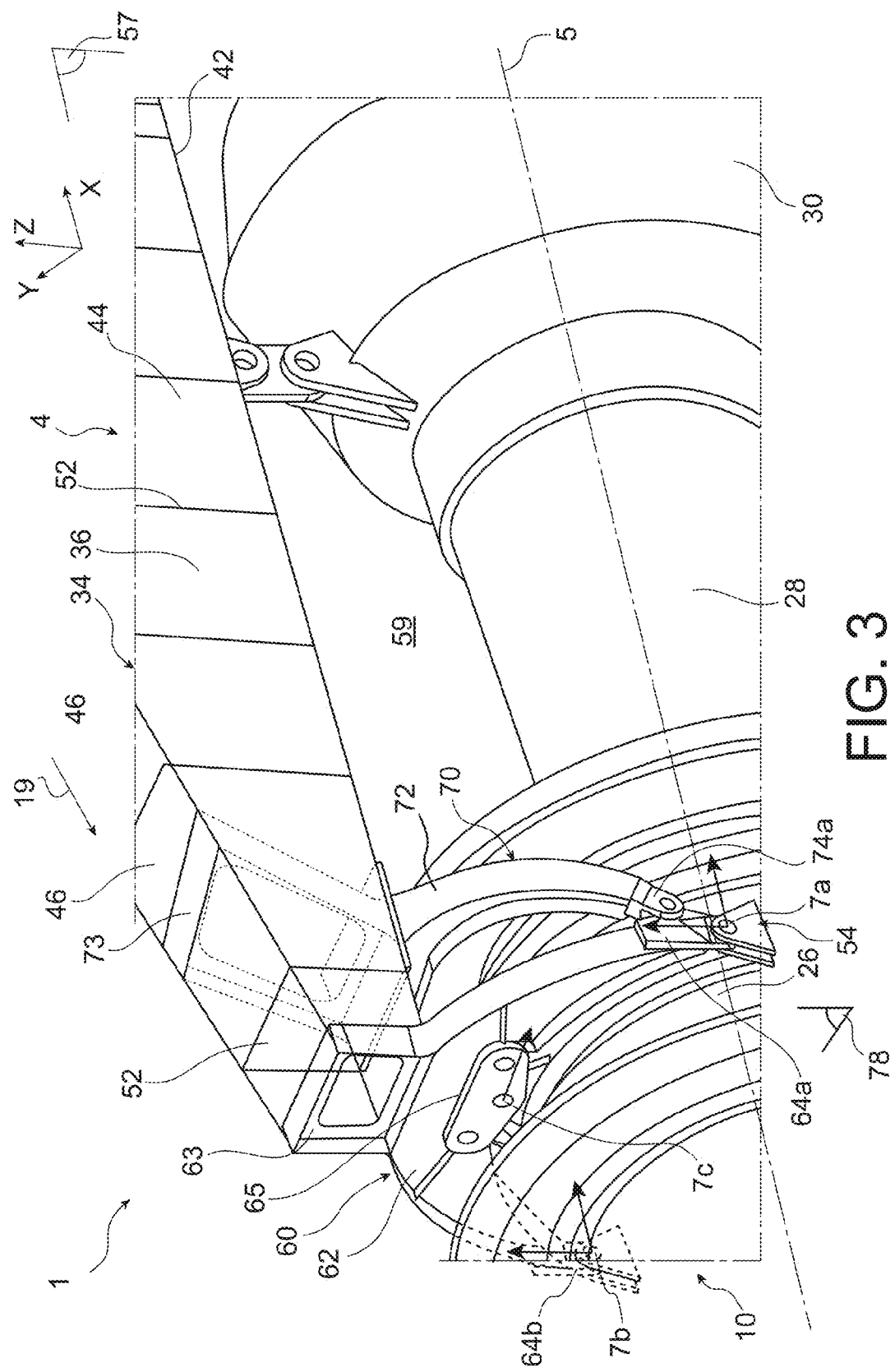
FIG. 3 is a more detailed perspective view of the engine assembly shown in the preceding figure.
Figure 4:
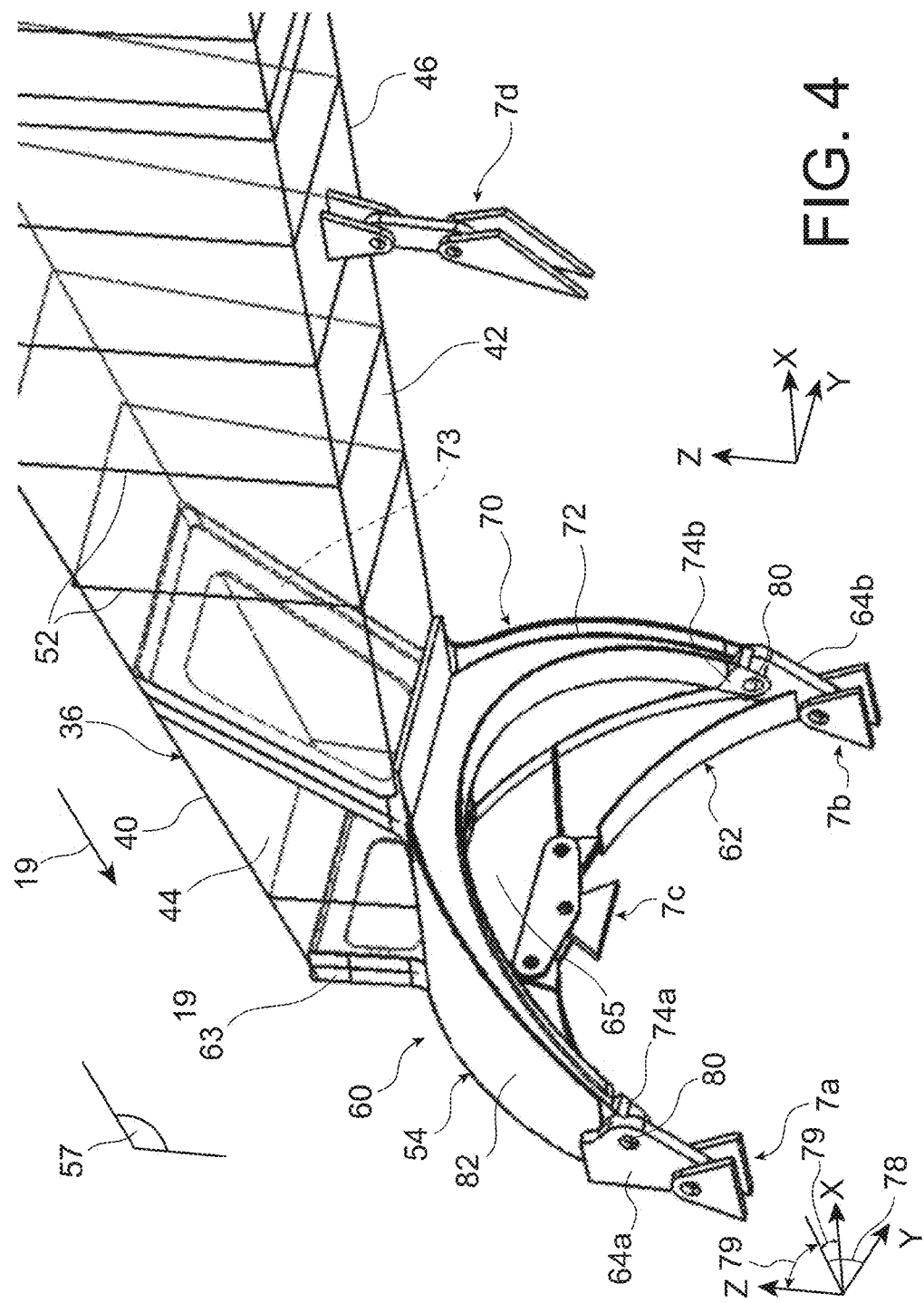
FIG. 4 is a perspective view of the rigid structure of the mounting pylon with which the engine assembly shown in the preceding figure is equipped.
Figure 5:
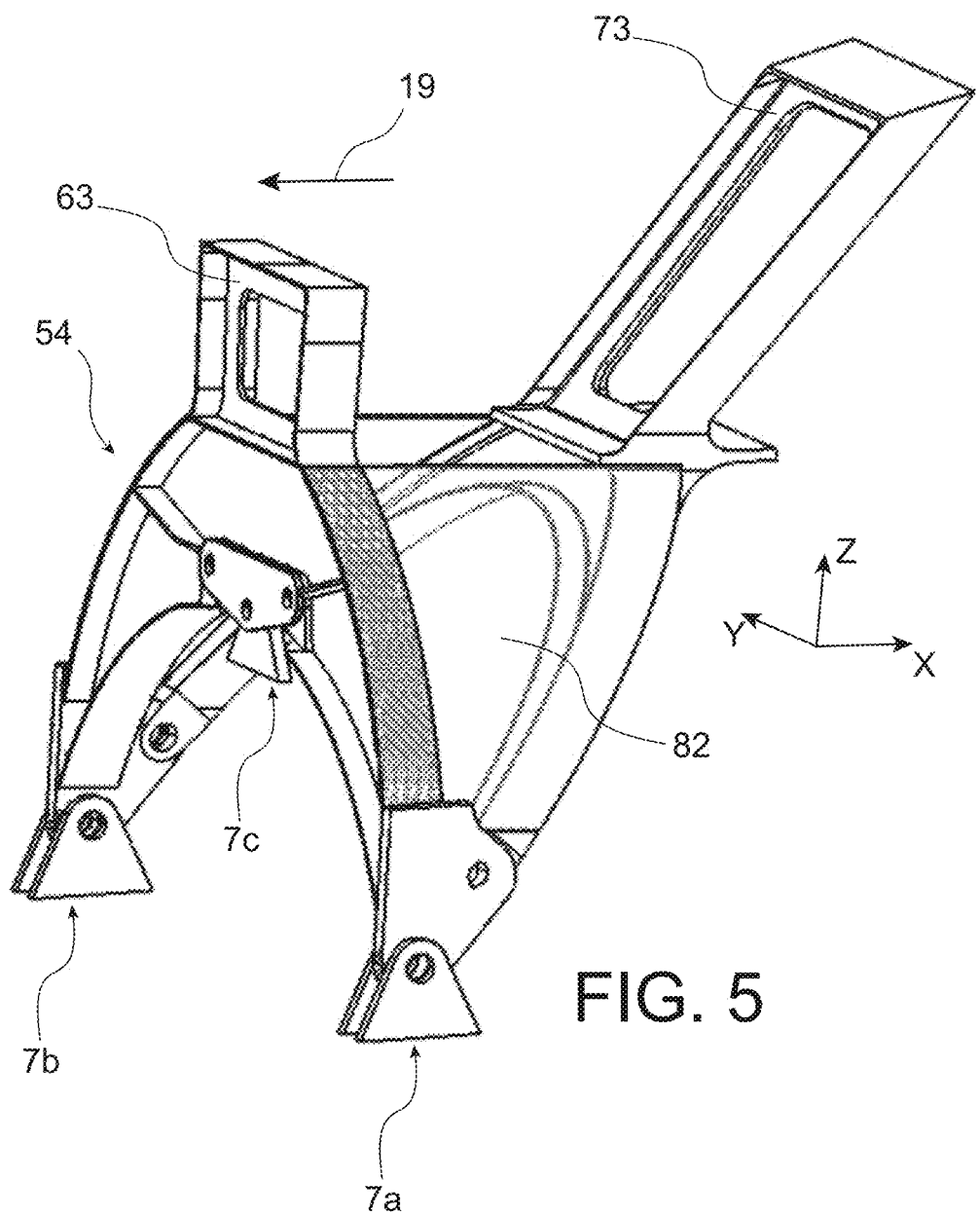
FIG. 5 is a perspective view of a box extension forming an integral part of the mounting pylon shown in the preceding figure.

Reference is now made more specifically to FIGS. 3 to 5 which depict in detail the design of the box extension 54. This first of all comprises a first component 60 produced as a single piece, preferably from a metallic material. This first component 60 is substantially planar and arranged in a vertical and transverse YZ plane, namely in a plane orthogonal to the X-direction. It comprises two vertically adjacent parts, namely a first part 62 in the overall shape of an arch extending around an upper portion of the reducing-gear case 26, and a first connecting structure 63 constituting one of the transverse stiffening ribs of the central box. More specifically, this first connecting structure 63 constitutes the rib that closes the front of the central box 36, even if this rib is likewise also preferably hollowed at its center, so that it has the overall shape of a square or of a rectangle.

The first part 62 is also referred to as being horseshoe-shaped, open at the bottom. It has two first opposite ends 64a, 64b, to which the two lateral front attachments 7a, 7b are respectively connected. These, just like the other attachments 7c, 7d, are produced in the conventional way using yokes and/or collars and/or clevises. The two attachments 7a, 7b are preferably arranged in 2 o'clock and 10 o'clock angular positions in a clock frame of reference centered on the axis 5. 3 o'clock and 9 o'clock positions may also be envisioned, without departing from the scope of the invention. In that case, the two lateral front attachments 7a, 7b are then diametrically opposed. In any case, the two attachments 7a, 7b are preferably arranged symmetrically with respect to a vertical and longitudinal midplane 57 of the assembly 1.

This same plane 57 passes through the central front attachment 7c which connects an upper end of the reducing-gear case 26 to a first central portion 65 of the first component 60. The three front attachments 7a-7c are thus arranged in the same vertical and transverse YZ plane in which the first component 60 is inscribed. In addition, it is noted that it is from the central portion 65 that the first connecting structure 63 extends upward, forming the rib closing the front of the central box 36.

The box extension 54 also comprises a second component 70 produced as a single piece, preferably from a metallic material. This second component 70 is substantially planar and arranged in a plane 78 parallel to the transverse direction Y, but inclined with respect to the vertical direction Z and longitudinal direction X. By way of nonlimiting example, the second component 70 is inclined by an angle 79 of approximately 45° with respect to each of the two directions X and Z.

The second component 70 comprises two vertically adjacent parts, namely a second part 72 in the overall shape of an arch extending at least partially around an upper portion of the reducing-gear case 26, and a second connecting structure 73 constituting one of the transverse interior stiffening ribs of the central box. More specifically, this second connecting structure 73 constitutes the second interior rib of the central box 36, counting from the front. It is also preferably hollowed out at its center, so as to have the overall shape of a square or rectangle.

The second part 72 is also referred to as being horseshoe-shaped, open at the bottom and toward the front. It has two second opposite ends 74a, 74b, respectively mounted on the two first opposite ends 64a, 64b. This mounting is via shear pins 80 and/or bolts, oriented in the Y-direction. These pins 80 are thus positioned near the two lateral front attachments 7a, 7b, also connected to the first ends 64a, 64b.

As is clear from the foregoing, the second component 70 of the box extension 54 differs from the vertical first component 60 in that it is inclined so that it extends rearward and toward the central box 36 from its second ends 74a, 74b.

The attachment means 7a-7d form a statically determinate load-reacting system. Specifically, as indicated schematically in FIG. 3, each of the two lateral front attachments 7a, 7b reacts load only in the X direction and Z direction, whereas the central front attachment 7c reacts load only in the Y direction. As for the rear engine attachment 7d, this reacts load only in the Z direction. In this regard, the foregoing description applies to how load is reacted under normal circumstances. However, if one of the attachments 7a-7d fails, the load-reaction distribution may differ.

Thus, under normal circumstances, the moment applied in the X direction is reacted vertically using the two lateral front attachments 7a, 7b, whereas the moment applied in the Z direction is reacted longitudinally using these same attachments 7a, 7b.

The invention therefore contrasts with the solutions of the prior art notably in that it no longer requires link rods for reacting thrust load. Here, loads in the X direction pass via the attachments 7a, 7b and then essentially via the second inclined and arch-shaped component 70. The fitting of a skin 82 externally covering the first and second parts 62, 72 also contributes to causing longitudinal load to pass through the entirety of the box extension 54, rather than through its second component 70 alone.

Of course, various modifications may be made by those skilled in the art to the invention that has just been described solely by way of nonlimiting examples.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An engine assembly for an aircraft comprising:
a turbofan turbine engine having a fan which is driven by a reduction gear, the turbine engine comprising a reducing-gear case surrounding the reduction gear;
a turbine engine mounting pylon, comprising a primary structure equipped with a central box; and
an attachment mechanism to attach the turbine engine to the primary structure of the mounting pylon,
wherein the primary structure of the mounting pylon also comprises a box extension connected to a front of the central box, the box extension comprising:
a first component produced as a single piece and arranged in a vertical and transverse plane of the engine assembly, the first component comprising a first part in the overall shape of an arch extending around the reducing-gear case, and a first connecting structure constituting a transverse stiffening rib of the central box, the first part in the overall shape of an arch having two first opposite ends; and
a second component produced as a single piece and comprising a second part in the overall shape of an arch extending at least partly around the reducing-gear case, and a second connecting structure constituting an interior transverse stiffening rib of the central box, the second part in the overall shape of an arch having two second opposite ends respectively mounted on the two first opposite ends, the second part in the overall shape of an arch extending rearward and toward the central box from its second opposite ends, and
wherein the attachment mechanism comprises two lateral front attachments and a central front attachment, each of the two lateral front attachments connecting the reducing-gear case to one of the two first ends of the first part in the overall shape of an arch and each reacting load in a longitudinal direction and in a vertical direction of the engine assembly, and the central front attachment connecting the reducing-gear case to a first central portion of the first part in the overall shape of an arch and reacting load in a transverse direction of the engine assembly.

2. The engine assembly as claimed in claim 1, wherein the second component of the box extension extends in a plane inclined with respect to the vertical and longitudinal directions of the engine assembly.

3. The engine assembly as claimed in claim 1, wherein the second component of the box extension extends in a plane inclined with respect to the vertical and longitudinal directions of the engine assembly, inclined by an angle comprised between 30 and 60° with respect to the longitudinal direction.

4. The engine assembly as claimed in claim 1, wherein the two lateral front attachments are arranged symmetrically with respect to a vertical and longitudinal midplane of the engine assembly, the vertical and longitudinal midplane passing through the central front attachment.

5. The engine assembly as claimed in claim 1, wherein the two lateral front attachments are arranged in angular positions, one of them between 2 o'clock and 3 o'clock and the other between 9 o'clock and 10 o'clock.

6. The engine assembly as claimed in claim 1, wherein the attachment means form a statically determinate load-reacting system and are made up of the two lateral front attachments, the central front attachment, and a rear attachment reacting load in the vertical direction.

7. The engine assembly as claimed in claim 1, wherein the box extension comprises at least one skin externally covering the first and second parts in the overall shape of an arch.

8. The engine assembly as claimed in claim 1, wherein the second opposite ends are mounted on the two first opposite ends by two shear pins respectively.

9. The engine assembly as claimed in claim 8, wherein the two shear pins are oriented in the transverse direction.

10. The engine assembly as claimed in claim 1, wherein the turbine engine comprises, in succession, from the front toward the rear, a fan case, an intermediate case, the reducing-gear case, a central case and a turbine case.

11. An aircraft comprising:
at least one engine assembly comprising:
a turbofan turbine engine having a fan which is driven by a reduction gear, the turbine engine comprising a reducing-gear case surrounding the reduction gear;
a turbine engine mounting pylon, comprising a primary structure equipped with a central box; and
an attachment mechanism to attach the turbine engine to the primary structure of the mounting pylon,
wherein the primary structure of the mounting pylon also comprises a box extension connected to a front of the central box, the box extension comprising:
a first component produced as a single piece and arranged in a vertical and transverse plane of the engine assembly, the first component comprising a first part in the overall shape of an arch extending around the reducing-gear case, and a first connecting structure constituting a transverse stiffening rib of the central box, the first part in the overall shape of an arch having two first opposite ends; and
a second component produced as a single piece and comprising a second part in the overall shape of an arch extending at least partly around the reducing-gear case, and a second connecting structure constituting an interior transverse stiffening rib of the central box, the second part in the overall shape of an arch having two second opposite ends respectively mounted on the two first opposite ends, the second part in the overall shape of an arch extending rearward and toward the central box from its second opposite ends, and
wherein the attachment mechanism comprises two lateral front attachments and a central front attachment, each of the two lateral front attachments connecting the reducing-gear case to one of the two first ends of the first part in the overall shape of an arch and each reacting load in a longitudinal direction and in a vertical direction of the engine assembly, and the central front attachment connecting the reducing-gear case to a first central portion of the first part in the overall shape of an arch and reacting load in a transverse direction of the engine assembly, and
a wing on which the engine assembly is mounted.

12. The aircraft as claimed in claim 11, wherein the engine assembly is suspended beneath the wing.

\* \* \* \* \*